(12) United States Patent
Rabal

(10) Patent No.: US 9,018,891 B2
(45) Date of Patent: Apr. 28, 2015

(54) DIRECT CURRENT BRUSHLESS MOTOR

(71) Applicant: Clifford R. Rabal, Terrell, TX (US)

(72) Inventor: Clifford R. Rabal, Terrell, TX (US)

(*) Notice: Subject to any disclaimer, the term of this patent is extended or adjusted under 35 U.S.C. 154(b) by 145 days.

(21) Appl. No.: 13/707,774

(22) Filed: Dec. 7, 2012

(65) Prior Publication Data

US 2013/0093295 A1    Apr. 18, 2013

Related U.S. Application Data

(63) Continuation-in-part of application No. 12/500,455, filed on Jul. 9, 2009, now Pat. No. 8,350,502.

(51) Int. Cl.
| | | |
|---|---|---|
| H02K 47/14 | (2006.01) | |
| H02K 21/10 | (2006.01) | |
| H02K 29/06 | (2006.01) | |
| H02K 21/24 | (2006.01) | |

(52) U.S. Cl.
CPC ............... H02K 47/14 (2013.01); H02K 29/06 (2013.01); H02K 21/24 (2013.01)

(58) Field of Classification Search
CPC ... H02K 49/046; H02K 49/065; H02K 49/10; H02P 31/00
USPC ................... 318/140, 139, 558, 701, 164, 34, 318/400.01, 555, 727, 148, 700, 730; 310/68 B, 156.25, 181; 322/46; 336/110
See application file for complete search history.

(56) References Cited

U.S. PATENT DOCUMENTS

| | | | |
|---|---|---|---|
| 1,373,621 A | 4/1921 | Lincoln | |
| 1,724,446 A | 8/1929 | Worthington | |
| 1,859,643 A | 5/1932 | Worthington | |
| 1,863,294 A | 6/1932 | Bogia | |
| 3,670,189 A | 6/1972 | Monroe | |
| 3,703,653 A | 11/1972 | Tracy | |
| 3,890,548 A | 6/1975 | Gray | |
| 4,025,831 A | 5/1977 | Webb | |
| 4,595,390 A | 6/1986 | Hakim | |
| 4,864,199 A * | 9/1989 | Dixon ..................... 318/400.09 | |
| 5,428,282 A * | 6/1995 | Johnson ........................ 318/701 | |
| 5,514,923 A * | 5/1996 | Gossler et al. .................. 310/74 | |
| 6,120,537 A | 9/2000 | Wampler | |
| 6,246,146 B1 | 6/2001 | Schiller | |
| 6,280,157 B1 * | 8/2001 | Cooper ...................... 417/423.7 | |
| 6,720,688 B1 | 4/2004 | Schiller | |
| 6,759,775 B2 | 7/2004 | Grimm | |
| 6,936,994 B1 | 8/2005 | Gimlan | |
| 7,733,050 B2 * | 6/2010 | Prasanna ........................ 318/539 | |
| 7,893,570 B2 * | 2/2011 | Redinbo ......................... 310/24 | |
| 8,350,502 B2 * | 1/2013 | Rabal ............................ 318/140 | |

(Continued)

*Primary Examiner* — Rita Leykin

(74) *Attorney, Agent, or Firm* — Jack D. Stone, Jr.; Scheef & Stone, L.L.P.

(57) ABSTRACT

A motor includes a frame, a shaft rotatably mounted onto the frame, and at least one disc mounted onto the shaft. At least one permanent magnet is mounted on the disc, and at least one electromagnet and at least one coil are mounted to the frame in rotational magnetic proximity to the permanent magnet. A battery is connectable to the electromagnet and the coil for energizing the electromagnet and for receiving electrical current from the coil for charging the battery. A relay switch controls the transmission of electrical power from the battery to the electromagnet. A sensor generates a signal to the relay switch to activate electrical power to the electromagnet upon sensing that the permanent magnet is positioned with respect to the electromagnet such that a magnetic force generated by the electromagnet would be effective for inducing movement of the permanent magnet and consequent rotation of the disc.

18 Claims, 4 Drawing Sheets

(56) References Cited

U.S. PATENT DOCUMENTS

| | | |
|---|---|---|
| 2004/0090140 A1 | 5/2004 | Lai |
| 2004/0263099 A1 | 12/2004 | Maslov |
| 2006/0238055 A1 | 10/2006 | Danford |
| 2007/0188036 A1 | 8/2007 | Shibukawa |
| 2007/0222318 A1 | 9/2007 | Godfrey |
| 2007/0284956 A1 | 12/2007 | Petrovich |
| 2008/0024017 A1 | 1/2008 | Chen |
| 2008/0164778 A1 | 7/2008 | Schieffer |
| 2011/0320074 A1 | 12/2011 | Eriston |

* cited by examiner

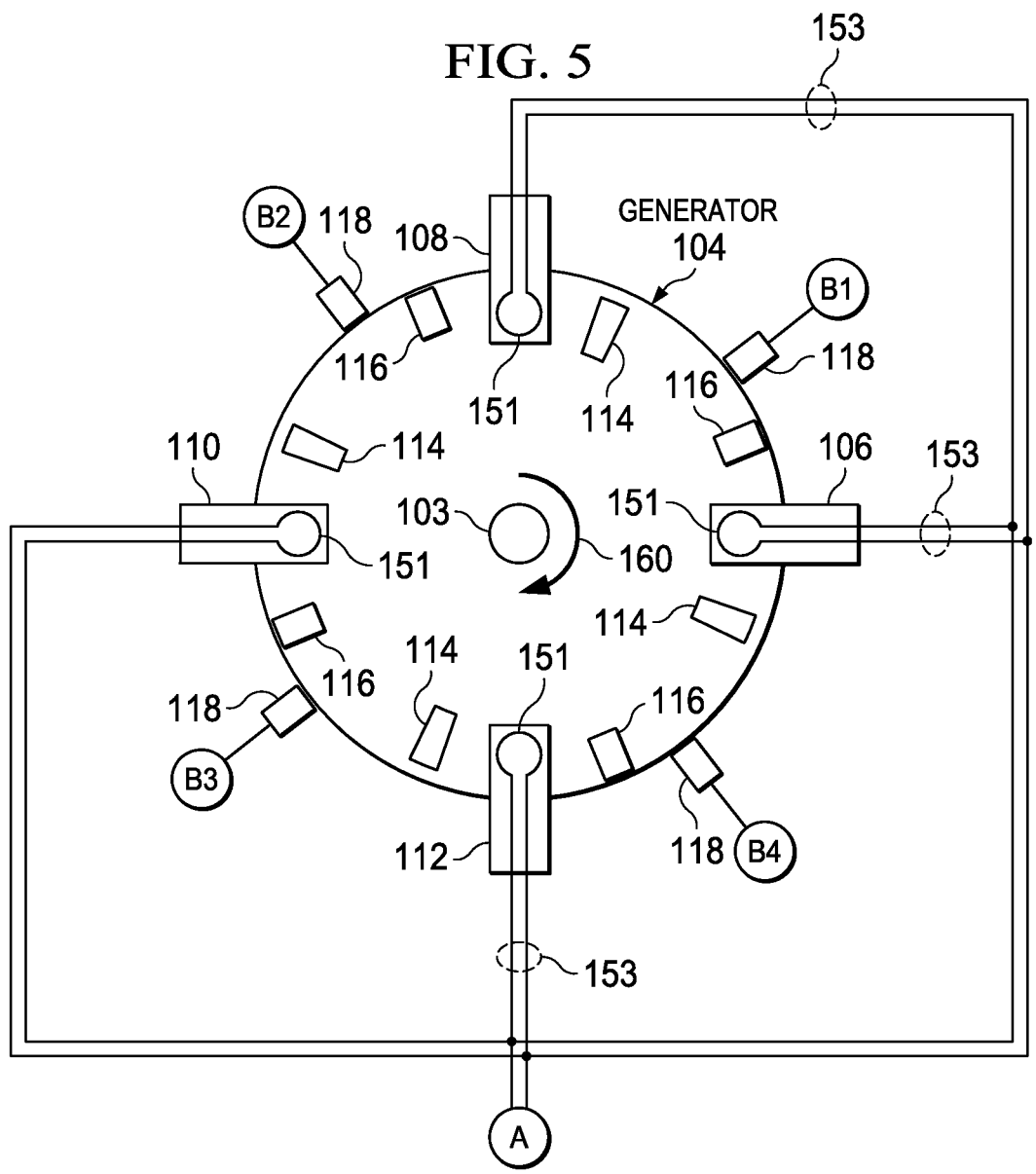

DIRECT CURRENT BRUSHLESS MOTOR

CROSS-REFERENCE TO RELATED APPLICATIONS

This application is a continuation-in-part application of prior application Ser. No. 12/500,455, filed Jul. 9, 2009.

TECHNICAL FIELD

The invention relates generally to motors and, more particularly, to direct current brushless electromagnetic motors.

BACKGROUND

Conventional internal combustion engines for automobiles and other purposes require an oil-based fuel source that, once consumed, does not renew. Globally, easily obtainable sources of oil are dwindling. The sources that remain viable are located in areas of the world that are unstable and often subject to extreme violence. In addition, industrialization of developing economies places additional demand on this dwindling resource. The combined effects of decreased supply, instability in producible regions, and increased global demand threatens to price the individual consumer of oil-based products out of the market over the long term.

Attempts to address this issue generally lead to the development of engines that do not consume oil-based fuel, such as those that use ethanol or bio-diesel. In addition, inventors have attempted to develop electromagnetic motors as replacements for modern internal combustion engines. An electromagnetic motor uses the attractive and repulsive forces of magnets to generate mechanical motion and electrical power. However, many electromagnetic motors are inefficient, requiring significantly more energy to generate power levels comparable to that of a modern internal combustion engine, making such electromagnetic motors poor substitutes for the internal combustion engine.

Therefore, it would be desirable to have an electromagnetic motor that is more efficient than convention motors and which would provide an effective substitute to the conventional internal combustion engine, thereby reducing the individual consumer's dependence on oil-based products.

SUMMARY

The present invention, accordingly, provides a motor having a frame, a shaft rotatably mounted onto the frame, and at least one disc mounted onto the shaft. At least one permanent magnet is mounted on the at least one disc off-center from the at least one disc, and at least one electromagnet is mounted to the frame in rotational magnetic proximity to the at least one permanent magnet, wherein the at least one electromagnet and the at least one permanent magnet are substantially radially equidistant from the shaft. At least one coil is mounted to the frame in rotational magnetic proximity to the at least one permanent magnet, wherein the at least one coil and the at least one permanent magnet are substantially radially equidistant from the shaft. A battery is connectable to the at least one electromagnet and the at least one coil for energizing the at least one electromagnet and for receiving current from the at least one coil for charging the battery. At least one relay switch is coupled between the battery and the at least one electromagnet for controlling the transmission of electrical power from the battery to the at least one electromagnet. At least one sensor is coupled to the at least one relay switch for generating a signal to the at least one relay switch to activate electrical power to the at least one electromagnet upon sensing that the at least one permanent magnet is positioned with respect to the at least one electromagnet such that a magnetic force generated by the electromagnet with respect to the at least one permanent magnet would be effective for inducing movement of the permanent magnet and consequent rotation of the at least one disc.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 5 is a schematic view of the lower disc (generator portion) of the motor of FIG. 1

DETAILED DESCRIPTION

Figure 1:
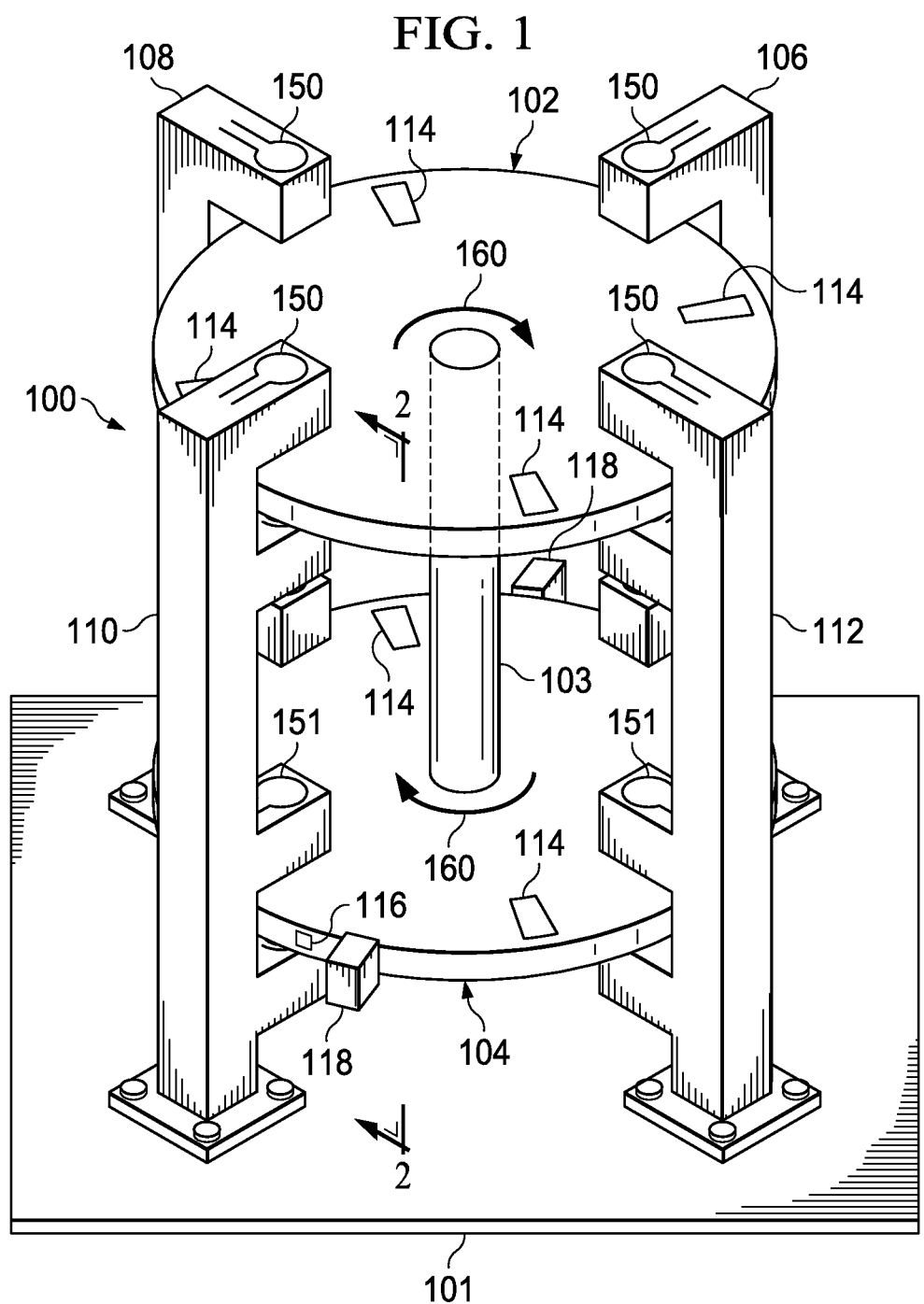
FIG. 1 is a perspective view exemplifying a motor embodying the mechanical features of the present invention.

Refer now to the drawings wherein depicted elements are, for the sake of clarity, not necessarily shown to scale and wherein like or similar elements are designated by the same reference numeral through the several views. In the interest of conciseness, well-known elements may be illustrated in schematic or block diagram form in order not to obscure the present invention in unnecessary detail, and details concerning various other components known to the art, such as solid state relay switches, rectifiers, switches, electromagnets, and the like necessary for the operation of many electrical devices, have not been shown or discussed in detail inasmuch as such details are not considered necessary to obtain a complete understanding of the present invention, and are considered to be within the skills of persons of ordinary skill in the relevant art. Additionally, as used herein, the term "substantially" is to be construed as a term of approximation.

Referring to FIG. 1 of the drawings, the reference numeral 100 generally designates a motor embodying features of the present invention. The system 100 includes a base platform 101 on which four towers 106, 108, 110, and 112 are mounted. A shaft 103 is rotationally mounted to the platform 101, and a motor disc 102 and a generator disc 104 are mounted on the shaft 103 such that the two discs preferably rotate together synchronously. The towers 106, 108, 110, and 112 are preferably positioned to be equally angularly spaced around the discs 102 and 104. While the motor 100 is exemplified with four towers and two discs, any number of towers and discs may be utilized. One or more of the discs 102 and 104 may constitute or comprise one or more flywheels.

Figure 2:
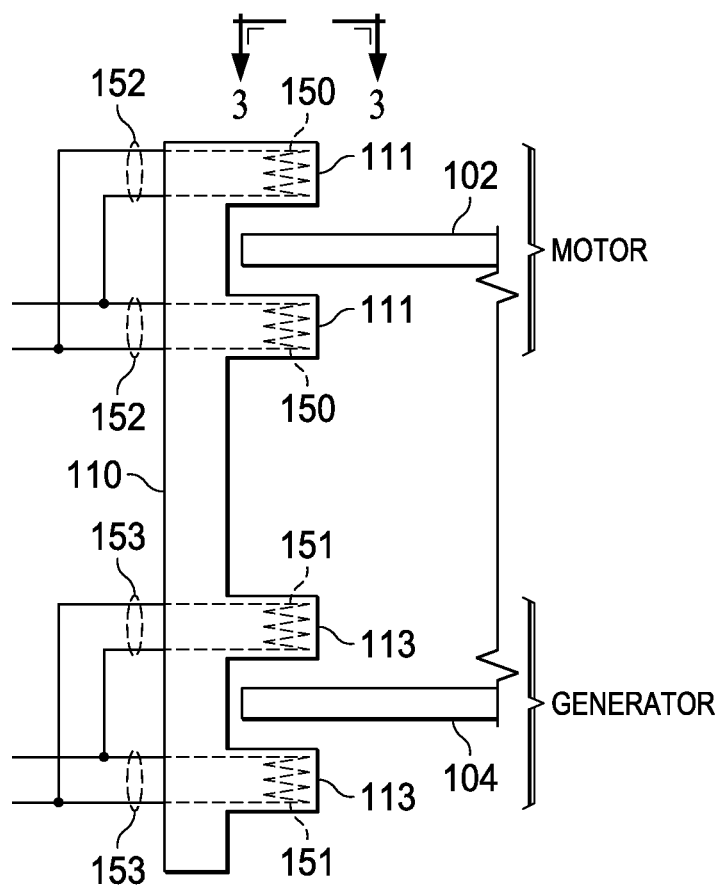
FIG. 2 is an elevation view of the motor of FIG. 1 taken along the line 2-2 of FIG. 1.

FIG. 2 exemplifies one tower, namely, tower 110, which is representative of the towers 106, 108, and 112. The tower 110 preferably includes two cantilevers 111, one above and one below the motor disc 102, and two cantilevers 113, one above and one below the generator disc 104. If there were additional discs, there would preferably also be an additional two cantilevers for each disc. Alternatively, if there were, for example, multiple motor discs, adjacent motor discs could share a common cantilever 111. Similarly, if there were multiple generator discs, adjacent generator discs could share a common cantilever 113.

Figure 3:
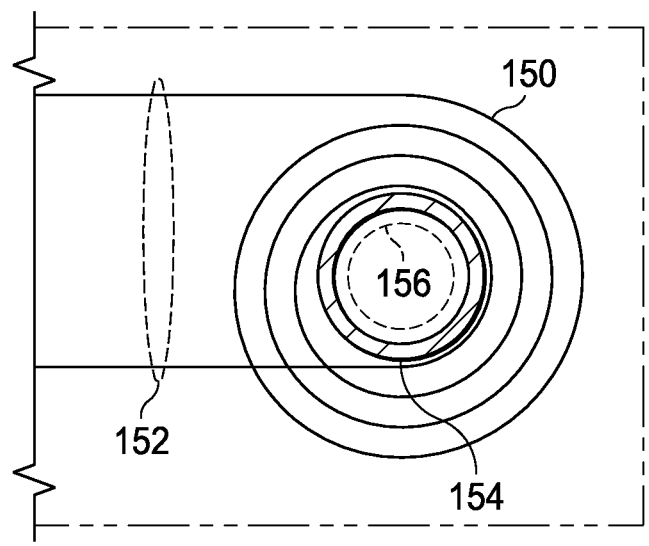
FIG. 3 is a top view of a tower of the motor of FIG. 1 taken along the line 3-3 of FIG. 2.

Referring to FIGS. 2 and 3, a coil (i.e., electromagnet) 150 is positioned within each cantilever 111 such that the coil defines a vertical axis. Similarly, a coil 151 is positioned within each cantilever 113 such that the coil defines a vertical axis. The coils 150 and 151 are substantially identical in configuration, and each preferably comprises wire wrapped around a non-conductive, or insulative, cylinder 154 having an air core 156. The wires constituting the coils 150 and 151 extend to wires 152 and 153, respectively, as discussed in further detail below with respect to FIGS. 4 and 5.

Figure 4:
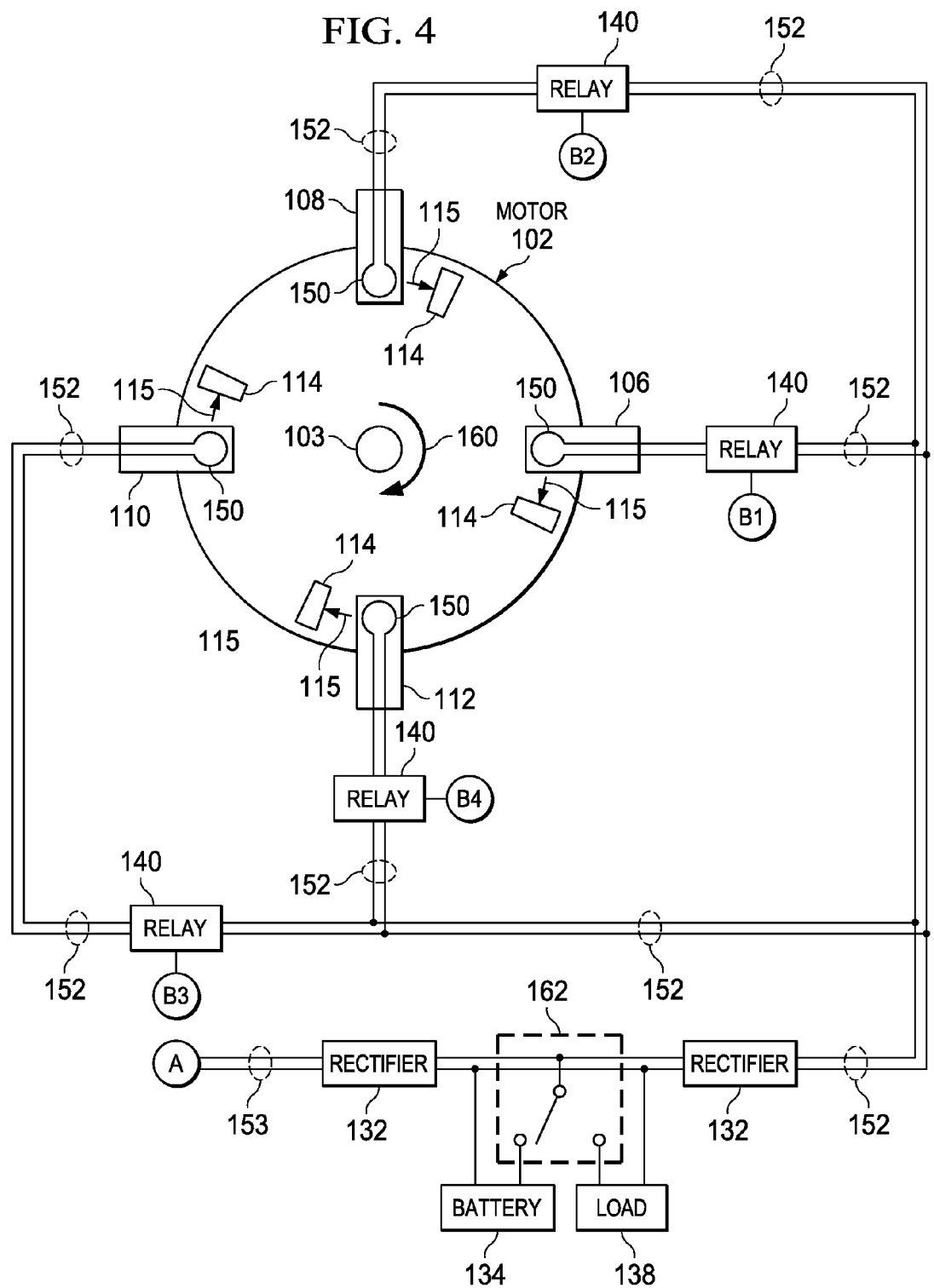
FIG. 4 is a schematic view of the upper disc of the motor of FIG. 1.

As shown in FIG. 4, the coils 150 are coupled together via the wires 152, and as shown in FIG. 5, the coils 151 are coupled together via the wires 153. The wires 152 and 153 are preferably coupled to a switch 162 (FIG. 4), such as a single pole, double throw switch. The single pole of the switch 162 is connected to one of the wires 152 and 153. One throw of the switch 162 is connected to one terminal of a battery 134, and the other throw of the switch 162 is connected to one terminal of a load 138. The other terminal of the battery 134 and the other terminal of the load 138 are connected to the other wire 152 not connected to the switch 162. The switch 162 may optionally include a third throw which would disconnect the wires 152 from both the battery 134 and the load 138. A rectifier 132 is preferably positioned on the wires 153 and optionally positioned on the wires 152 for converting alternating current (AC) (e.g., from the generator) to direct current (DC) (e.g., for the battery or load). The rectifiers 132 are preferably of solid state design, and are preferably full wave, or bridge, rectifiers. The battery 134 is preferably any unit effective for storing electrical energy, and the load 138 is any device or apparatus that requires electrical power to operate.

As further depicted in FIGS. 4 and 5, each disc 102 and 104 include four magnets 114 embedded in each disc proximate to an outer edge of the respective disc, and positioned therein so that, upon proper rotation of the discs, each magnet 114 on the disc 102 is preferably directly aligned under a corresponding coil 150, and each magnet 114 on the disc 104 is preferably directly aligned under a corresponding coil 151. The number of magnets may vary, but preferably corresponds to the number of towers. The magnets 114 are preferably fabricated from a rare earth material (i.e., the fifteen lanthanides plus scandium and yttrium).

As shown in FIG. 5, the disc 104 also includes four timing lugs 116 preferably mounted on, and equally spaced about, the circumference of the disc 104. Four proximity switches or sensors 118 are mounted on the frame 101 and are positioned with respect to the timing lugs 116 so that the proximity sensors can sense when the timing lugs are aligned with the proximity sensors. More specifically, the timing lugs 116 are positioned on the disc 104 so that when the proximity sensors 118 sense the timing lugs, the magnets 114 are positioned and aligned directly under a corresponding coil 151. The proximity sensors are preferably inductive proximity sensors and the timing lugs are preferably magnets detectable by the proximity sensors, but the proximity sensors and timing lugs may be of any type (e.g., infrared, acoustic, capacitive) so long as they work together and the proximity sensors can detect the timing lugs. It is understood that the proximity sensors and timing lugs may alternatively be positioned with respect to the motor disc 102. Alternatively, a firing ring may be used in place of the timing lugs, wherein the firing ring is preferably mounted on a surface of the disc 104, and defines a surface having at least one discontinuity corresponding positionally to at least one permanent magnet.

With reference to FIGS. 4 and 5, the proximity sensors 118 are configured so that, upon sensing a timing lug 116, they generate a signal to a respective relay switch 140 (FIG. 4). The relay switches 140 are preferably of solid state design, and are configured so that, upon receipt of a signal from a proximity sensor 118, they permit electrical current to flow through the wires 152 to the coils 150 for a predetermined amount of time. The predetermined amount of time may correspond to the amount of time it takes for a magnet 114 to travel half the distance from one coil to a next coil. It is also understood that a single proximity sensor 118, a single timing lug 116, and/or a single relay switch 140 may be used to achieve the same end as described herein.

In operation, electrical power is applied by either the generator disk 104 and/or the battery 134 via the wires 152 to the relay switches 140. When the relay switches 140 receive a signal from a respective proximity sensor 118 (discussed below), the relay switches close the circuit and permit electrical current received from the battery 134 to flow to the coils 150. That current causes the coils 150, as electromagnets, to generate an electromagnetic field which "pushes" the magnets 114, and thereby induces rotation of the disc 102. The current in the coils 150 and the electromagnetic field generated thereby is preferably discontinued as the magnets 114 approach the next coil 150, about half way between the last coil 150 and the next coil 150. A brake mechanism (not shown) is optionally provided to bias the discs 102 and 104, when stopped, to a preselected position to enhance subsequent starting of the motor, such as where the magnets 114 are in position to be "pushed" by the coils 150, and/or where the timing lugs 116 are aligned with the proximity sensors 118.

As discussed above, the discs 102 and 104 preferably rotate together and synchronously, and so the disc 104 rotates with the disc 102. Accordingly, as the disc 102 and, hence, the disc 104 rotate, the magnets 114 on the disc 104 pass by the coils 151 and induce AC in the coils 151. The AC generated in the coils 151 flows along the wires 153 to a rectifier 132 which converts the AC to DC. The DC on the wires 153 flows to the switch 162 which then directs the DC to either the battery 134 or the load 138. If the switch 162 includes an optional third throw, then both the battery 134 or the load 138 could be disconnected from receiving electrical current from the wires 153.

As the disc 104 rotates, the timing lugs 116 move along a circular path and pass by the proximity sensors 118. When the timing lugs 116 are proximate to the proximity sensors 118 (which is when the magnets 114 of the disc 102 are vertically aligned with the coils 150), the proximity sensors 118 generate a signal to a respective relay switch 140. Upon receipt of the signal, each relay switch 140 closes a circuit which permits electrical current to flow via the wires 152 to respective magnet coils 150, preferably until the respective magnets 114 become closer to the next coil 150 than the last coil 150, thereby pushing the magnets 114 of the disc 102 and inducing the rotation of the discs as discussed above.

By the use of the present invention, a more efficient DC brushless motor can be utilized for any purpose for which a motor would be needed, with significant conservation of energy.

It is understood that the present invention may take many forms and embodiments. Accordingly, several variations may be made in the foregoing without departing from the spirit or the scope of the invention. For example, the coils 150 can be configured to not only push the magnets 114 when the magnets are rotating away from the coils, but to also pull the magnets 114 when the magnets are approaching the coils. An inverter may be serially positioned on the lines 152 between the battery 134 and the coils 150. A photovoltaic cell may be electrically coupled to the battery for providing a supplemental source of electrical power.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A motor comprising:
a frame;
a shaft rotatably mounted onto the frame;
at least one disc mounted onto the shaft;
at least one permanent magnet mounted on the at least one disc off-center from the at least one disc;
at least one electromagnet mounted to the frame in rotational magnetic proximity to the at least one permanent magnet, the at least one electromagnet and the at least one permanent magnet being substantially radially equidistant from the shaft;
at least one coil mounted to the frame in rotational magnetic proximity to the at least one permanent magnet, the at least one coil and the at least one permanent magnet being substantially radially equidistant from the shaft so that when the at least one disc is rotated, the at least one permanent magnet moves relative to the at least one coil with the result that the at least one coil generates alternating current;
a battery connectable to the at least one electromagnet and the at least one coil for energizing the at least one electromagnet and for receiving alternating current from the at least one coil for charging the battery;
at least one relay switch coupled between the battery and the at least one electromagnet for controlling the transmission of electrical power between the battery and the at least one electromagnet; and
at least one sensor coupled to the at least one relay switch for generating a signal to the at least one relay switch to activate electrical power to the at least one electromagnet upon sensing that the at least one permanent magnet is positioned with respect to the at least one electromagnet such that a magnetic force generated by the electromagnet with respect to the at least one permanent magnet would be effective for inducing movement of the permanent magnet and consequent rotation of the at least one disc.

2. The motor of claim 1, further comprising a rectifier electrically coupled between the at least one coil and the battery for converting alternating current generated by the at least one coil to direct current for charging the battery.

3. The motor of claim 1, further comprising a rectifier electrically coupled between the at least one coil and a load for converting alternating current generated by the at least one coil to direct current for powering a load.

4. The motor of claim 1, wherein the at least one disc comprises a flywheel.

5. The motor of claim 1, wherein the at least one permanent magnet comprises a surface which is flush with a surface of the at least one disc.

6. The motor of claim 1 wherein:
the at least one electromagnet comprises a plurality of electromagnets;
the at least one coil comprises a plurality of coils; and
the at least one permanent magnet comprises a plurality of permanent magnets mounted on the at least one disc positioned in rotatable magnetic proximity to at least one of the plurality of permanent magnets.

7. The motor of claim 1, wherein the sensor for generating a signal comprises:
a firing ring mounted on a surface of the at least one disc, the firing ring having a surface defining at least one discontinuity corresponding positionally to the at least one first permanent magnet; and
at least one proximity sensor mounted on the frame for detecting the at least one discontinuity, and for generating a signal to the relay switch upon detection of the timing lug, the relay switch being configured for controlling electrical power to the at least one electromagnet in response to receipt of the signal from the at least one proximity sensor to cause the at least one electromagnet to generate a magnetic force on the at least one permanent magnet.

8. The motor of claim 1, wherein the sensor for generating a signal comprises:
at least one timing lug mounted on a surface of the at least one disc at a position corresponding to the at least one permanent magnet; and
at least one proximity sensor mounted on the frame for detecting the at least one timing lug, and for generating a signal to the relay switch upon detection of the timing lug, the relay switch being configured for controlling electrical power to the at least one electromagnet in response to receipt of the signal from the proximity sensor to cause the at least one electromagnet to generate a magnetic force on the at least one permanent magnet.

9. The motor of claim 1, wherein the at least one relay switch comprises at least one solid state relay switch.

10. The motor of claim 1 further comprising a mechanism for converting the rotational inertia of the at least one disc into mechanical power, the mechanism being mechanically coupled to the at least one disc.

11. The motor of claim 1 further comprising a photovoltaic cell electrically coupled to the battery for providing a supplemental source of electrical power.

12. The motor of claim 1, wherein the at least one disc comprises at least one first disc and at least one second disc mounted on a common shaft for synchronous rotation, and wherein the at least one electromagnet is mounted to the frame.

13. The motor of claim 1, wherein the at least one coil comprises an air core.

14. The motor of claim 1, wherein the at least one permanent magnet is fabricated from a rare earth metal.

15. A motor comprising:
a frame;
a shaft rotatably mounted onto the frame;
at least one first disc mounted onto the shaft;
at least one second disc mounted onto the shaft;
at least one first permanent magnet mounted on the at least one first disc distal from the shaft;
at least one electromagnet mounted to the frame in rotational magnetic proximity to the at least one first permanent magnet, the at least one electromagnet and the at least one first permanent magnet being substantially radially equidistant from the shaft;
at least one second permanent magnet mounted on the at least one second disc distal from the shaft;
at least one coil mounted to the frame in rotational magnetic proximity to the at least one second permanent magnet, the at least one coil and the at least one second permanent magnet being substantially radially equidistant from the shaft so that when the at least one second disc is rotated, the at least one second permanent magnet moves relative to the at least one coil with the result that the at least one coil generates alternating current;
a battery connectable to the at least one electromagnet and the at least one coil for energizing the at least one electromagnet and for receiving alternating current from the at least one coil for charging the battery;
at least one relay switch coupled between the battery and the at least one electromagnet for controlling the transmission of electrical power from the battery to the at least one electromagnet; and
at least one sensor coupled to the at least one relay switch for generating a signal to the at least one relay switch to activate electrical power to the at least one electromagnet upon sensing that the at least one first permanent magnet is positioned with respect to the at least one electromagnet such that a magnetic force generated by the electromagnet with respect to the at least one first permanent magnet would be effective for inducing movement of the permanent magnet and consequent rotation of the at least one disc.

16. The motor of claim 15, further comprising:
a rectifier electrically coupled between the at least one coil and the battery for converting alternating current generated by the at least one coil to direct current for charging the battery; and
a rectifier electrically coupled between the at least one coil and a load for converting alternating current generated by the at least one coil to direct current for powering a load.

17. The motor of claim 15, wherein the at least one coil comprises an air core.

18. The motor of claim 15, wherein the at least one first permanent magnet and the at least one second permanent magnet are fabricated from a rare earth metal.

* * * * *